(12) United States Patent
Finkle

(10) Patent No.: US 10,998,802 B2
(45) Date of Patent: May 4, 2021

(54) HYBRID INDUCTION MOTOR WITH SELF ALIGNING HYBRID INDUCTION/PERMANENT MAGNET ROTOR

(71) Applicant: Louis J. Finkle, Lakewood, CA (US)

(72) Inventor: Louis J. Finkle, Lakewood, CA (US)

(*) Notice: Subject to any disclaimer, the term of this patent is extended or adjusted under 35 U.S.C. 154(b) by 0 days.

(21) Appl. No.: 15/438,023

(22) Filed: Feb. 21, 2017

(65) Prior Publication Data

US 2018/0166959 A1  Jun. 14, 2018

(51) Int. Cl.
| H02K 17/26 | (2006.01) |
| H02K 1/22 | (2006.01) |
| H02K 21/46 | (2006.01) |
| H02K 16/02 | (2006.01) |
| H02K 1/14 | (2006.01) |
| H02K 17/16 | (2006.01) |
| H02K 5/173 | (2006.01) |

(52) U.S. Cl.
CPC .......... H02K 17/26 (2013.01); H02K 1/146 (2013.01); H02K 1/223 (2013.01); H02K 16/02 (2013.01); H02K 17/165 (2013.01); H02K 21/46 (2013.01); H02K 5/1732 (2013.01)

(58) Field of Classification Search
CPC ........ H02K 17/26; H02K 1/223; H02K 21/46; H02K 16/02; H02K 1/146; H02K 17/165; H02K 5/1732
USPC ..... 310/114, 125, 126, 156.78, 211, 216.107
See application file for complete search history.

(56) References Cited

U.S. PATENT DOCUMENTS

| 2,209,558 | A |   | 7/1940 | Bing et al. |
| 2,243,616 | A |   | 5/1941 | Bing et al. |
| 2,287,286 | A |   | 6/1942 | Bing et al. |
| 2,558,540 | A |   | 6/1951 | Clos |
| 2,864,017 | A | * | 12/1958 | Waltscheff ............. H02K 51/00 310/126 |
| 3,445,699 | A |   | 5/1969 | Beaudry |
| 3,459,981 | A |   | 8/1969 | Dotto |

(Continued)

FOREIGN PATENT DOCUMENTS

| CN | 102868268 | 1/2011 |
| CN | 1360748 | 7/2014 |

(Continued)

Primary Examiner — John K Kim
(74) Attorney, Agent, or Firm — Averill & Green; Kenneth L. Green

(57) ABSTRACT

A hybrid induction motor includes a fixed stator, an independently rotating outer rotor, and an inner rotor fixed to a motor shaft. The outer rotor is designed to have a low moment of inertia and includes angularly spaced apart first bars and permanent magnets on an inner surface of the outer rotor. The inner rotor includes angularly spaced apart second bars and interior flux barriers aligned with the second bars. The outer rotor is initially accelerated by cooperation of a rotating stator magnetic field with the first bars. As the outer rotor accelerates towards synchronous RPM, a rotating magnetic field of the permanent magnets cooperate with the second bars of the inner rotor to accelerate the inner rotor. At near synchronous speed the rotating stator magnetic field reaches through the outer rotor and into the inner rotor coupling the two rotors for efficient permanent magnet operation.

18 Claims, 9 Drawing Sheets

(56) References Cited

U.S. PATENT DOCUMENTS

| | | | |
|---|---|---|---|
| 3,758,800 A * | 9/1973 | McLaughlin | H02K 1/246 |
| | | | 310/211 |
| 4,151,431 A | 4/1979 | Johnson | |
| 4,285,725 A | 8/1981 | Gysel et al. | |
| 4,482,034 A | 11/1984 | Baermann | |
| 4,508,998 A | 4/1985 | Hahn | |
| 4,578,609 A | 3/1986 | McCarty | |
| 4,829,205 A | 5/1989 | Lindgren et al. | |
| 5,166,654 A | 11/1992 | Doyelle | |
| 5,285,124 A | 2/1994 | Satake | |
| 5,508,576 A | 4/1996 | Nagate et al. | |
| 5,594,289 A | 1/1997 | Minato | |
| 5,861,700 A * | 1/1999 | Kim | H02K 1/32 |
| | | | 310/216.119 |
| 5,886,443 A | 3/1999 | Dymond | |
| 6,181,047 B1 | 1/2001 | Nitta | |
| 6,376,959 B1 | 4/2002 | Leupold | |
| 6,771,000 B2 | 8/2004 | Kim et al. | |
| 6,864,773 B2 | 3/2005 | Perrin | |
| 7,459,815 B2 | 12/2008 | Han et al. | |
| 7,567,004 B2 | 7/2009 | Smith | |
| 7,741,746 B2 | 6/2010 | Groening | |
| 7,851,962 B1 | 12/2010 | Williams | |
| 8,072,108 B2 | 12/2011 | Finkle | |
| 8,097,993 B2 | 1/2012 | Finkle | |
| 8,288,908 B2 | 10/2012 | Finkle et al. | |
| 8,390,162 B2 | 3/2013 | Finkle et al. | |
| 8,810,098 B2 * | 8/2014 | Bright | H02K 49/102 |
| | | | 310/114 |
| 9,484,794 B2 * | 11/2016 | Finkle | H02K 21/46 |
| 9,923,439 B2 * | 3/2018 | Finkle | H02K 21/46 |
| 9,923,440 B2 * | 3/2018 | Finkle | H02K 21/46 |
| 2004/0041481 A1 | 3/2004 | Kuo | |
| 2006/0038457 A1 | 2/2006 | Miyata et al. | |
| 2006/0108888 A1 | 5/2006 | Jung et al. | |
| 2006/0131984 A1 * | 6/2006 | Han | H02K 21/028 |
| | | | 310/261.1 |
| 2006/0175924 A1 * | 8/2006 | Han | H02K 7/125 |
| | | | 310/166 |
| 2006/0226722 A1 * | 10/2006 | Kim | H02K 17/34 |
| | | | 310/114 |
| 2007/0228856 A1 | 10/2007 | Bates et al. | |
| 2008/0169717 A1 | 7/2008 | Takashima | |
| 2008/0179987 A1 | 7/2008 | Imazu | |
| 2008/0272667 A1 | 11/2008 | Lonel | |
| 2009/0315329 A1 | 12/2009 | Duffey | |
| 2010/0219304 A1 | 9/2010 | Miros et al. | |
| 2010/0219704 A1 * | 9/2010 | Han | H02K 16/00 |
| | | | 310/48 |
| 2011/0156518 A1 | 6/2011 | Bright | |
| 2011/0163623 A1 | 7/2011 | Rens | |
| 2011/0101812 A1 | 11/2011 | Finkle et al. | |
| 2013/0057091 A1 | 3/2013 | Kim | |
| 2013/0078123 A1 * | 3/2013 | Fukasaku | H02K 1/278 |
| | | | 417/410.1 |
| 2013/0234553 A1 | 9/2013 | Kusase | |
| 2013/0278096 A1 * | 10/2013 | Finkle | H02K 21/46 |
| | | | 310/78 |
| 2015/0194868 A1 * | 7/2015 | Finkle | H02K 17/26 |
| | | | 310/125 |
| 2018/0166959 A1 * | 6/2018 | Finkle | H02K 1/223 |

FOREIGN PATENT DOCUMENTS

| | | |
|---|---|---|
| DE | 4421594 | 7/2014 |
| EP | 1524755 A1 | 4/2005 |
| EP | 1689067 | 8/2006 |
| GB | 495813 | 11/1938 |
| JP | S 51-47208 | 4/1976 |
| JP | 62-117558 | 11/1988 |
| JP | 9065591 | 11/1988 |
| JP | H04-331445 | 11/1992 |
| JP | H 07-203644 A | 3/1997 |
| JP | H11146615 A | 5/1999 |
| JP | H11146615 A | 11/1999 |
| JP | H11146645 A | 11/1999 |
| JP | 11341757 | 12/1999 |
| JP | 2002272067 | 9/2002 |
| JP | 2002-315244 | 10/2002 |
| JP | 2003-088071 A | 3/2003 |
| JP | 2004 135377 A | 3/2003 |
| JP | 2004 140978 | 5/2004 |
| JP | 2004 336915 A | 11/2004 |
| JP | 2005124383 A | 5/2005 |
| JP | 2005-210826 | 8/2005 |
| JP | 2006-254638 | 8/2005 |
| JP | 2006-217792 | 8/2006 |
| JP | 2006-352973 A | 9/2006 |
| JP | 2007-503199 | 2/2007 |
| JP | 2008-148455 | 6/2008 |
| JP | 2011-061933 | 3/2011 |
| JP | 201145509 S5 | 6/2014 |
| JP | 5702692 B2 | 4/2015 |
| JP | 2017502641 A | 1/2017 |
| KR | 10-2005-011667 | 12/2005 |
| WO | WO 88/05976 | 8/1988 |
| WO | WO2004107539 | 8/1988 |
| WO | WO2011145509 A1 | 7/2013 |
| WO | WO2013-158881 | 10/2013 |

* cited by examiner

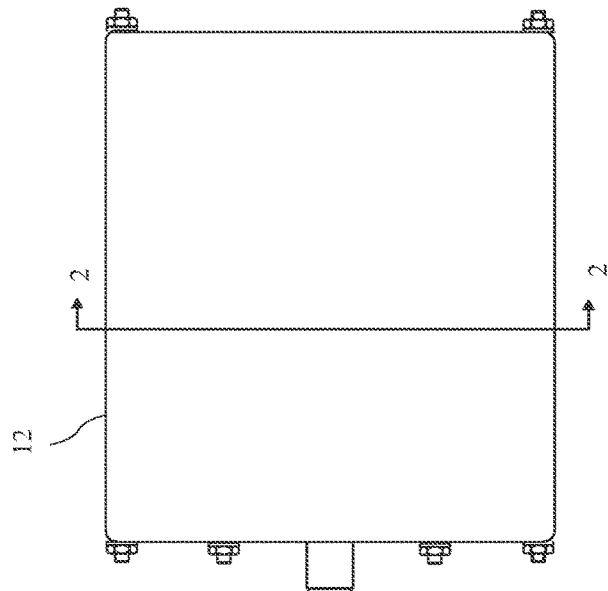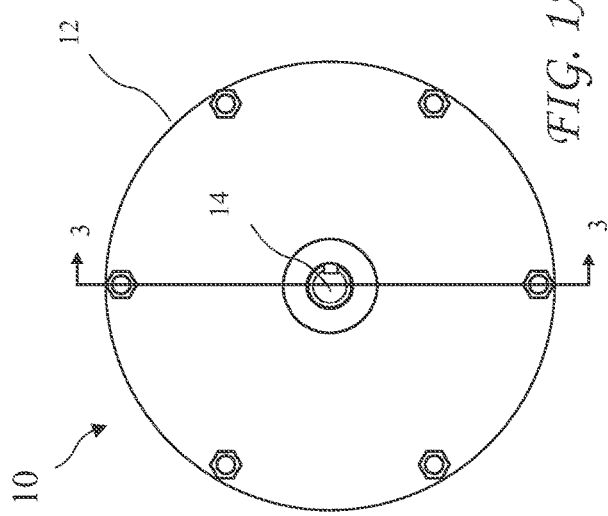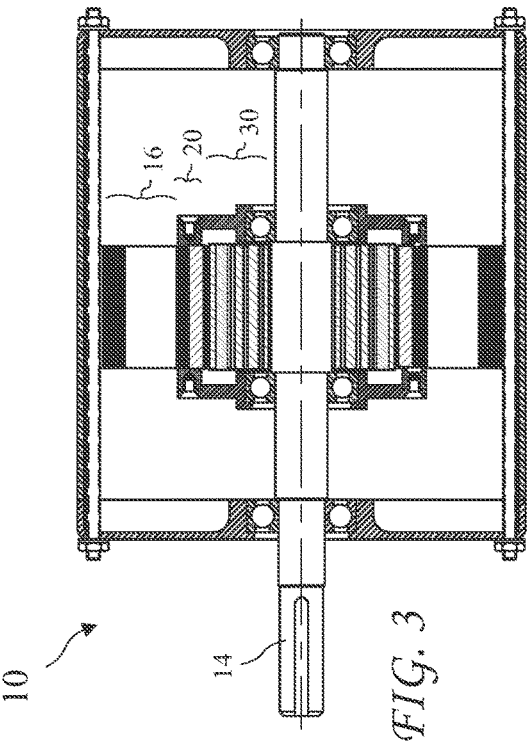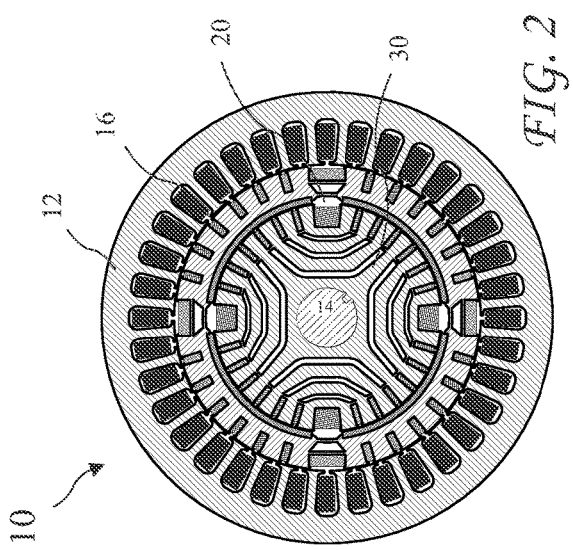

HYBRID INDUCTION MOTOR WITH SELF ALIGNING HYBRID INDUCTION/PERMANENT MAGNET ROTOR

BACKGROUND OF THE INVENTION

The present invention relates to electric motors and in particular to an induction motor having an independently rotating permanent magnet rotor variably coupled to an inductive rotor to reconfigure the motor from asynchronous induction operation at startup to synchronous operation after startup for efficient operation.

A preferred form of electric motors are brushless AC induction motors. The rotors of induction motors include a cage (or squirrel cage resembling a "hamster wheel") rotating inside a stator. The cage comprises axially running bars angularly spaced apart on the outer perimeter of the rotor. An AC current provided to the stator introduces a rotating stator magnetic field inside the rotor, and the rotating field inductively induces current in the bars. The current induced in the bars creates an induced magnetic field which cooperates with the stator magnetic field to produce torque and thus rotation of the rotor.

The introduction of current into the bars requires that the bars are not moving (or rotating) synchronously with the rotating stator magnetic field because electromagnetic induction requires relative motion (called slipping) between a magnetic field and a conductor in the field. As a result, the rotor must slip with respect to the rotating stator magnetic field to induce current in the bars to produce torque, and the induction motors are therefore called asynchronous motors.

Unfortunately, low power induction motors are not highly efficient at designed operating speed, and are even less efficient under reduced loads because the amount of power consumed by the stator remains constant at such reduced loads.

One approach to improving induction motor efficiency has been to add permanent magnets to the rotor. The motor initially starts in the same manner as a typical induction motor, but as the motor reached its operating speed, the stator magnetic field cooperates with the permanent magnets to enter synchronous operation. Unfortunately, the permanent magnets are limited in size because if the permanent magnets are too large, they prevent the motor from starting. Such size limitation limits the benefit obtained from the addition of the permanent magnets.

U.S. patent application Ser. No. 14/151,333 filed Jan. 9, 2014 filed by the present Applicant discloses an electric motor having an outer stator, an inner rotor including bars, fixed to a motor shaft, and a free spinning outer rotor including permanent magnets and bars, residing between the inner rotor and the stator. At startup, a rotating stator field accelerates the free spinning outer rotor, and after accelerating, the permanent magnets of the free spinning outer rotor accelerate and then lock with the inner rotor to achieve efficient permanent magnet operation.

The design of the '333 application is suitable for some motor designs, but in other designs, surface effects on the surface of the inner rotor reduce coupling of the inner rotor with the rotating magnetic fields.

BRIEF SUMMARY OF THE INVENTION

The present invention addresses the above and other needs by providing a hybrid induction motor includes a fixed stator, an independently rotating outer rotor, and an inner rotor fixed to a motor shaft. The outer rotor is designed to have a low moment of inertia and includes angularly spaced apart first bars and permanent magnets on an inner surface of the outer rotor. The inner rotor includes angularly spaced apart second bars and interior flux barriers aligned with the second bars. The outer rotor is initially accelerated by cooperation of a rotating stator magnetic field with the first bars. As the outer rotor accelerates towards synchronous RPM, a rotating magnetic field of the permanent magnets cooperate with the second bars of the inner rotor to accelerate the inner rotor. At near synchronous speed the rotating stator magnetic field reaches through the outer rotor and into the inner rotor coupling the two rotors for efficient permanent magnet operation.

In accordance with one aspect of the invention, there is provided a hybrid induction motor which includes a fixed stator, an independently rotating Hybrid Permanent Magnet/ squirrel Cage (HPMSC) outer rotor, and a Squirrel Cage (SC) inner rotor fixed to a motor shaft. The HPMSC outer rotor has a multiplicity of angularly spaced apart first bars proximal to an outer surface of the HPMSC outer rotor, and a plurality of permanent magnets on an inner surface of the HPMSC outer rotor. The SC inner rotor has a multiplicity of angularly spaced apart second bars proximal to an outer surface of the SC inner rotor, and magnetic flux barriers aligned with the second bars in rotor laminates. The flux barriers establish lines of stator magnetic flux though the HPMSC outer rotor and the SC inner rotor at synchronous speed to couple the HPMSC outer rotor and the SC inner rotor.

The HPMSC outer rotor is initially accelerated by cooperation of the rotating stator magnetic field with the first bars. Once the HPMSC outer rotor is rotating, the permanent magnets create a rotating magnetic field in the SC inner rotor cooperating with the second bars to accelerate the SC inner rotor. As the HPMSC outer rotor accelerates towards synchronous RPM, the stator field reaches through the HPMSC outer rotor and cooperates with the permanent magnets, and into the SC inner rotor coupling the HPMSC and SC inner rotors, to transition to synchronous operation.

In accordance with yet another aspect of the invention, there is provided a motor having stronger permanent magnets than known Line Start Permanent Magnet (LSPM). Known LSPM motors are limited by braking and pulsating torques caused by the permanent magnets. The first bars and magnets of the HPMSC outer rotor are light weight and the HPMSC outer is decoupled from the motor shaft and load at startup, allowing stronger permanent magnets than the known LSPM motors. The stronger permanent magnets provide improved efficiency.

In accordance with yet another aspect of the invention, there is provided a motor having outer bars of an HPMSC outer rotor aligned with inner bars of an SC inner rotor. At synchronous speed magnetic field lines of the rotating stator magnetic field pass between the aligned bars and into the SC inner rotor to couple the HPMSC outer rotor and the SC inner rotor.

In accordance with still another aspect of the invention, there is provided a motor having a number of larger squirrel cage bars mixed with smaller squirrel cage bars of the HPMSC outer rotor. The larger bars improve the structural strength of the HPMSC outer rotor.

In accordance with another aspect of the invention, there is provided a method according to the present invention. The method includes providing electrical current to a stator, generating a rotating stator magnetic field, the rotating stator magnetic field inductively cooperating with a squirrel cage of an HPMSC outer rotor, the rotating stator magnetic field accelerating the HPMSC outer rotor, permanent magnets of the HPMSC outer rotor generating a rotating permanent magnet magnetic field, the rotating permanent magnet magnetic field inductively cooperating with a squirrel cage of an SC inner rotor, the rotating stator magnetic field accelerating the SC outer rotor, the HPMSC outer rotor and SC inner rotor approaching synchronous speed, and the HPMSC outer rotor and SC inner rotor magnetically coupling at synchronous speed.

In accordance with yet another aspect of the invention, there is provided a hybrid induction motor according to the present invention including a Hybrid Permanent Magnet Hysteresis (HPMH) outer rotor. An eddy current ring (or hysteresis) inductive starting element replaces the squirrel cage of the HPMSC outer rotor to provide initial starting torque. Once the HPMH outer rotor reaches synchronous speed, the inductive starting element has no effect on motor operation. The eddy current ring may be any electrically conductive material would be potential material for starting element and is commonly hard chrome or cobalt steel but may be any non ferrous material. A preferably material for the HPMH outer rotor ring of the present invention is copper which is efficient because of its high electrical conductivity. Silver is slightly better performing than copper having better electrical conductivity and aluminum is lower performing than copper having less electrical conductivity. Potentially, new nano technology and a new class of highly conductive material could offer better performance than copper.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1A shows an end view of an electric motor having an independently rotating Hybrid Permanent Magnet/squirrel Cage (HPMSC) outer rotor and a Squirrel Cage (SC) inner rotor fixedly coupled to a motor shaft, according to the present invention.

FIG. 1B shows a side view of the electric motor having an independently rotating HPMSC outer rotor and a Squirrel Cage (SC) inner rotor fixedly coupled to a motor shaft, according to the present invention.

FIG. 2 shows a cross-sectional view of the electric motor having the independently rotating HPMSC outer rotor and the SC inner rotor fixedly coupled to a motor shaft taken along line 2-2 of FIG. 1B, according to the present invention.

FIG. 3 shows a cross-sectional view of the electric motor having the independently rotating HPMSC outer rotor and the SC inner rotor fixedly coupled to a motor shaft taken along line 3-3 of FIG. 1A, according to the present invention.

Corresponding reference characters indicate corresponding components throughout the several views of the drawings.

DETAILED DESCRIPTION OF THE INVENTION

Figure 4:
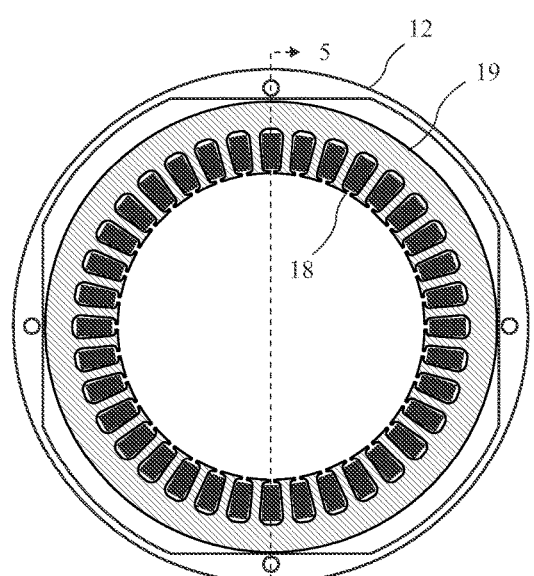
FIG. 4 shows a cross-sectional view of a housing and fixed stator portion of the electric motor having the independently rotating HPMSC outer rotor and the SC inner rotor fixedly coupled to a motor shaft taken along line 2-2 of FIG. 1B, according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

The term "not mechanically coupled" is used herein to describe a first structure connection to second structure through bearings, and no other mechanical/material connection exists between the first and second structure. The structures may however be magnetically coupled which is not considered a mechanical coupled in the present patent application.

An end view of an electric motor 10 having an independently rotating Hybrid Permanent Magnet/squirrel Cage (HPMSC) outer (or first) rotor 20 and a Squirrel Cage (SC) inner (or second) rotor 30 fixedly coupled to a motor shaft 14, according to the present invention is shown in FIG. 1A, and a side view of the electric motor 10 is shown in FIG. 1B. A cross-sectional view of the electric motor 10 taken along line 2-2 of FIG. 1B, is shown in FIG. 2 and a cross-sectional view of the electric motor 10 taken along line 3-3 of FIG. 1A is shown in FIG. 3. The electric motor 10 includes a housing 12, a stator portion 16 fixedly coupled to the housing 12, the independently rotating HPMSC outer rotor 20 riding on bearings 29 (see FIG. 7), and the SC inner rotor 30 fixed to the motor shaft 14. The HPMSC outer rotor 20 is mounted to the motor shaft 14 by bearings and is not mechanically coupled to rotate with the motor shaft 14. The HPMSC outer rotor 20 is mounted to the motor shaft 14 by bearings and is not mechanically coupled to rotate with the motor shaft 14.

Figure 5:
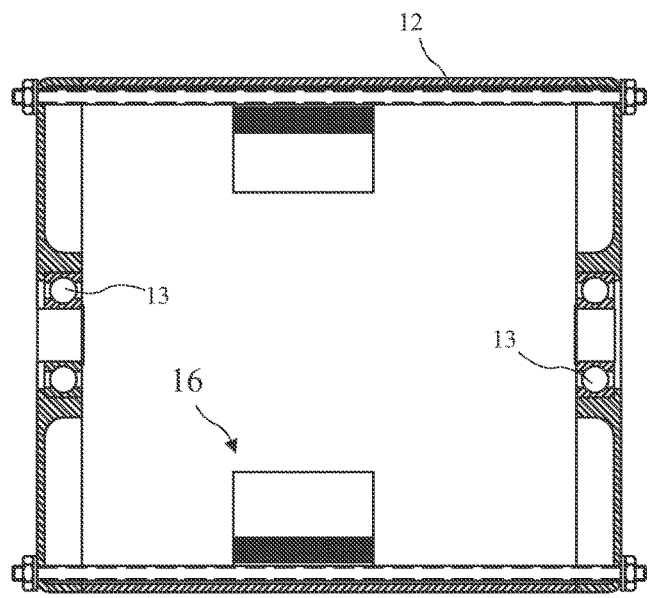
FIG. 5 shows a cross-sectional view of the housing and the fixed stator portion of the electric motor having the independently rotating HPMSC outer rotor and the SC inner rotor fixedly coupled to a motor shaft taken along line 5-5 of FIG. 4, according to the present invention.

A cross-sectional view of the housing 12 and fixed stator portion 16 of the electric motor 10 taken along line 2-2 of FIG. 1B, is shown in FIG. 4 and a cross-sectional view of the housing 12 and the fixed stator portion 16 taken along line 5-5 of FIG. 4, is shown in FIG. 5. Fixed stator windings 18 reside in a stator core 19. The stator windings 18 create a rotating stator magnetic field when provided with an Alternating Current (AC) signal. The housing 12 includes bearings 13 for carrying the shaft 14.

Figure 6:
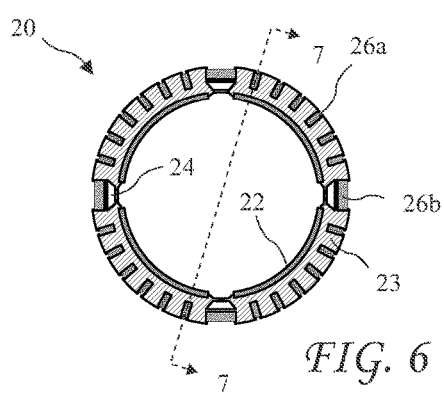
FIG. 6 shows a cross-sectional view of the independently rotating HPMSC outer rotor of the electric motor having the independently rotating HPMSC outer rotor and the SC inner rotor fixedly coupled to a motor shaft taken along line 2-2 of FIG. 1B, according to the present invention.
Figure 7:
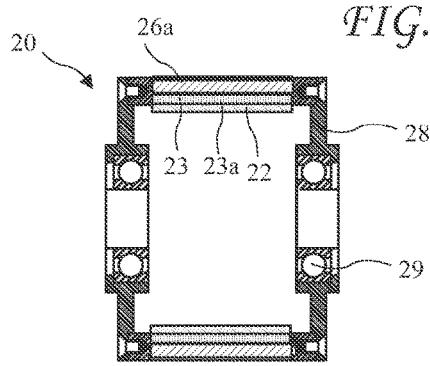
FIG. 7 shows a cross-sectional view of the independently rotating HPMSC outer rotor of the electric motor having the independently rotating HPMSC outer rotor and the SC inner rotor fixedly coupled to a motor shaft taken along line 7-7 of FIG. 6, according to the present invention.

A cross-sectional view of the independently rotating HPMSC outer rotor 20 taken along line 2-2 of FIG. 1B, is shown in FIG. 6 and a cross-sectional view of the independently rotating HPMSC outer rotor 20 taken along line 7-7 of FIG. 6, is shown in FIG. 7. The HPMSC outer rotor 20 includes angularly spaced apart permanent magnets 22 on an interior of the HPMSC outer rotor 20 and angularly spaced apart first bars 26a and 26b residing proximal to an outer surface of the HPMSC outer rotor 20 embedded in a core (or laminate) 23. The HPMSC outer rotor 20 may include any even number of permanent magnets 22, for example, two, four, six, eight, etc. permanent magnets 22 (see FIGS. 12A-12D). Non-ferrous voids 24 in the rotor core 23 are present between the permanent magnets 22. The voids 24 are air gaps or non ferrous material to provide flux barriers, if a ferrous material was present between the magnets 22, magnetic flux would curl back into the magnets 22, shorting much of the magnetic flux lines back into the magnets 22. The core 23 is preferably a laminated core and thin laminates 23a of the core 23 forming the core 23 may result in flux leakage. The thickness of the laminates 23a is preferably optimized to minimize the leakage while maintaining mechanical integrity of the rotor core laminates 23. The bars 26a and 26b are preferably evenly angularly spaced apart. The magnets 22 are preferably neodymium magnets bonded to an inside surface of the rotor core 23.

The HPMSC outer rotor 20 may include only minor bars 26a but preferably also includes larger major bars 26b providing structural strength. The major bars 26b preferably reside angularly (i.e., may be spaced out radially) between the permanent magnets 22 and the number of major bars 26b preferably us the same as the number of magnets 22. The voids 24 preferably reside under the major bars 26b. The bars 26a and 26b are preferably made of a light weight material, for example, aluminum. The magnets 22 are also preferably made of alight weight material, and are preferably rare earth magnets allowing lighter weight for a given magnet strength. The light weight of the bars 26a and 26, and the magnets 22, reduce the moment of inertia of the HPMSC outer rotor 20 allowing the HPMSC outer rotor 20 to overcome braking and pulsating torques caused by the permanent magnets 22, thus allowing stronger permanent magnets 22 and greater efficiency than a LSPM motor. A balance between bars 26a and 26b resistance and rotor core 23 saturation may be optimized and the shape, number and dimensions of the bars 26a and 26b may have great effect on performance, for example, motor startup.

Rotor end caps 28 are attached to opposite ends of the HPMSC outer rotor 20 and include bearings 29 allowing the HPMSC outer rotor 20 to rotate freely on the motor shaft 14. The bearings 29 are preferably low friction bearings (for example, ball bearings or roller bearings), but may simple be bushings (for example, bronze bushings, oilite bushings, or Kevlar® bushings). The HPMSC outer rotor 20 is not mechanically coupled to rotate with the SC inner 30 or the motor shaft 14 at any time.

Figure 8:
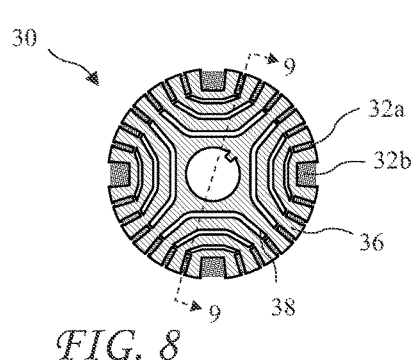
FIG. 8 shows a cross-sectional view of an SC inner rotor of the electric motor having the independently rotating HPMSC outer rotor and the SC inner rotor fixedly coupled to a motor shaft taken along line 2-2 of FIG. 1B, according to the present invention.
Figure 9:
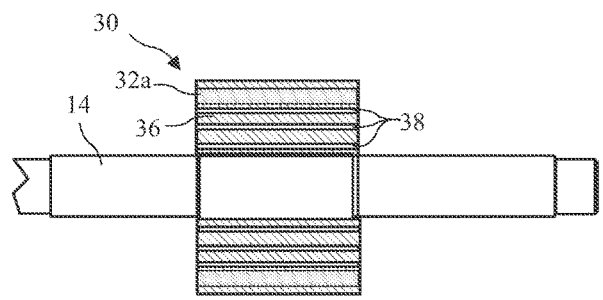
FIG. 9 shows a cross-sectional view of the SC inner rotor of the electric motor having the independently rotating HPMSC outer rotor and the SC inner rotor fixedly coupled to a motor shaft taken along line 9-9 of FIG. 8, according to the present invention.

A cross-sectional view of the SC inner rotor 30 of the electric motor 10 taken along line 2-2 of FIG. 1B, is shown in FIG. 8 and a cross-sectional view of the SC inner rotor 30 of the electric motor 10 taken along line 9-9 of FIG. 8, is shown in FIG. 9. The SC inner rotor 30 is fixed to the motor shaft 14 and cooperates with the HPMSC outer rotor 20 to magnetically couple the HPMSC outer rotor 20 to the motor shaft 14 at synchronous speed. Second minor bars (or squirrel cage bars) 32a and major bars (or squirrel cage bars) 32b reside in a second rotor core (or laminate) 36. The bars 32a and 32b are not necessarily, but are preferably evenly angularly spaced apart. The major bars 32b add structural strength to the SC inner rotor 30 and help direct lines of magnetic flux 50 (see FIG. 11B).

Figure 10A:
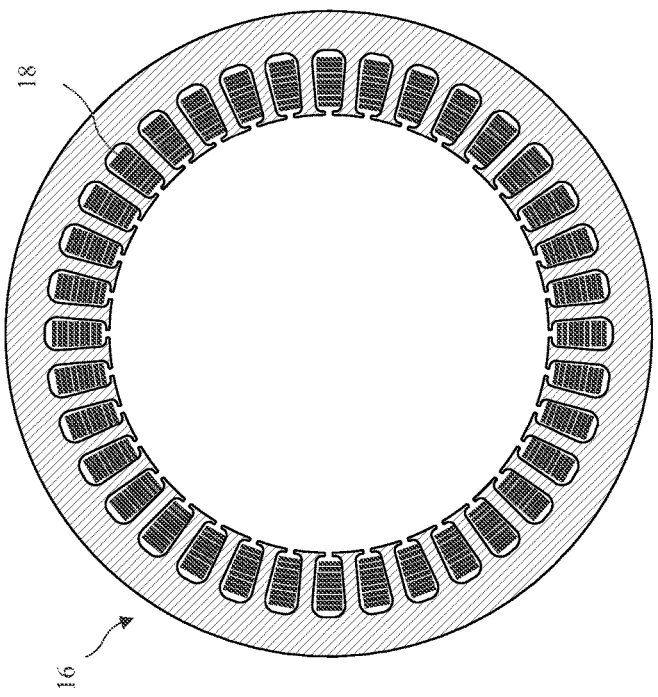
FIG. 10A shows a cross-sectional view of a stator of the sixth embodiment of the motor having a hybrid inductive/permanent magnet outer rotor according to the present invention.
Figure 10C:
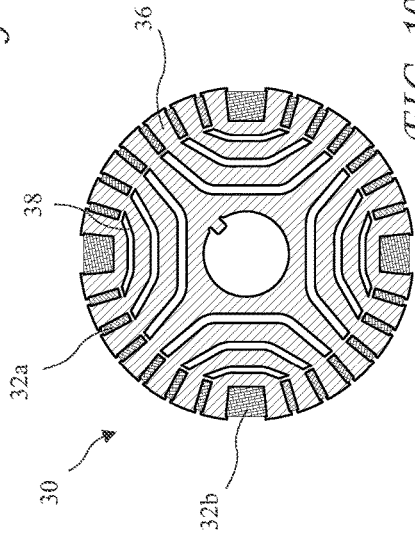
FIG. 10C shows a cross-sectional view of an inner inductive rotor of the sixth embodiment of the motor having a hybrid inductive/permanent magnet outer rotor according to the present invention.
Figure 10:
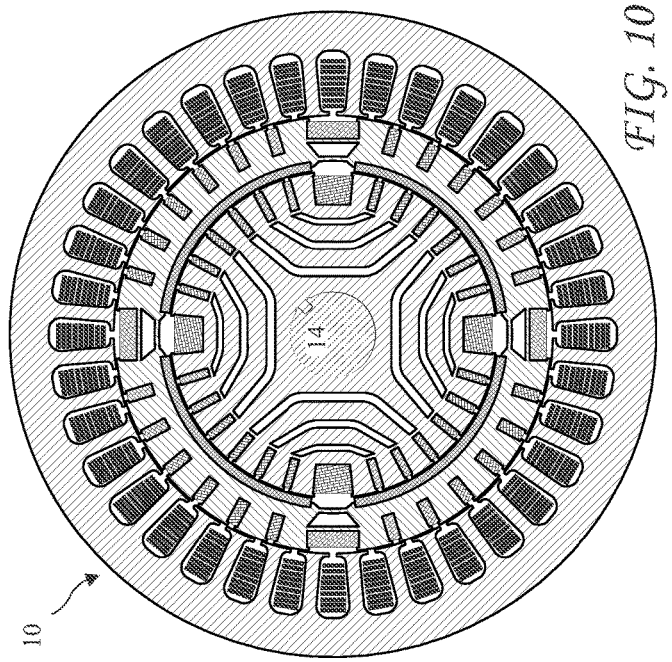
FIG. 10 shows a cross-sectional view of a sixth embodiment of a motor having a hybrid inductive/permanent magnet outer rotor according to the present invention.
Figure 10B:
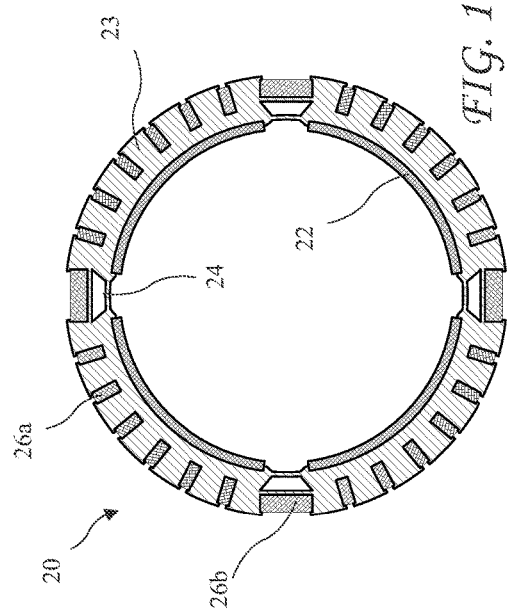
FIG. 10B shows a cross-sectional view of the hybrid inductive/permanent magnet outer rotor of the sixth embodiment of the motor having a hybrid inductive/permanent magnet outer rotor according to the present invention.

A detailed cross-sectional view of the motor 10 is shown in FIG. 10, a cross-sectional view of a stator 16 of the motor 10 is shown in FIG. 10A, a cross-sectional view of the HPMSC outer rotor 20 of the motor 10 is shown in FIG. 10B, and a cross-sectional view of a SC inner rotor 30 of the motor 10 is shown in FIG. 10C. The stator 16 includes stator windings 18 in a laminate 19 creating a rotating stator magnetic field.

The HPMSC outer rotor 20 is rotationally coupled to the motor shaft through bearings 29 (see FIG. 7) and includes the minor squirrel cage bars 26a and the major squirrel cage bars 26b, the bars 26a and 26b are em bedded in the laminate 23. The permanent magnets 24 reside on an inner surface of the HPMSC outer rotor 20 facing the SC inner rotor 30.

The SC inner rotor 30 includes the minor bars 32a and the major bars 32b. The flux barriers 38 follow a concave path through the laminate 36 and outer ends of the flux barriers 38 are generally aligned with the minor bars 32a. Both the minor bars 32a and the major bars 32b are slightly recessed into the laminate 36.

Figure 11B:
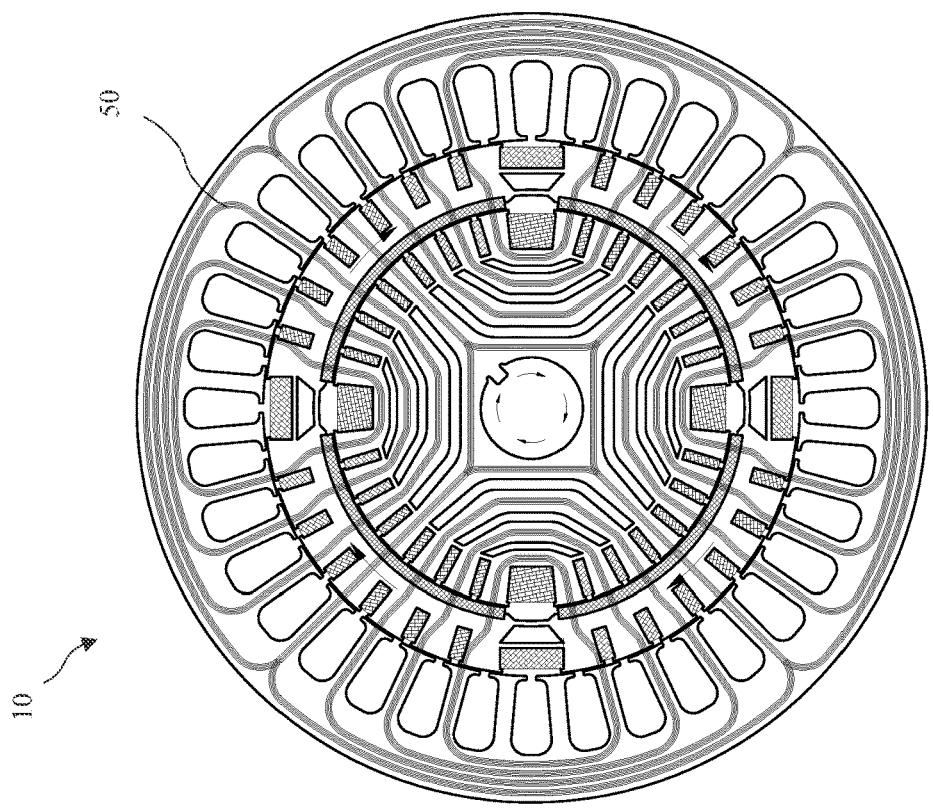
FIG. 11B shows magnetic field lines of the sixth embodiment of the motor having a hybrid inductive/permanent magnet outer rotor at synchronous speed according to the present invention.
Figure 11A:
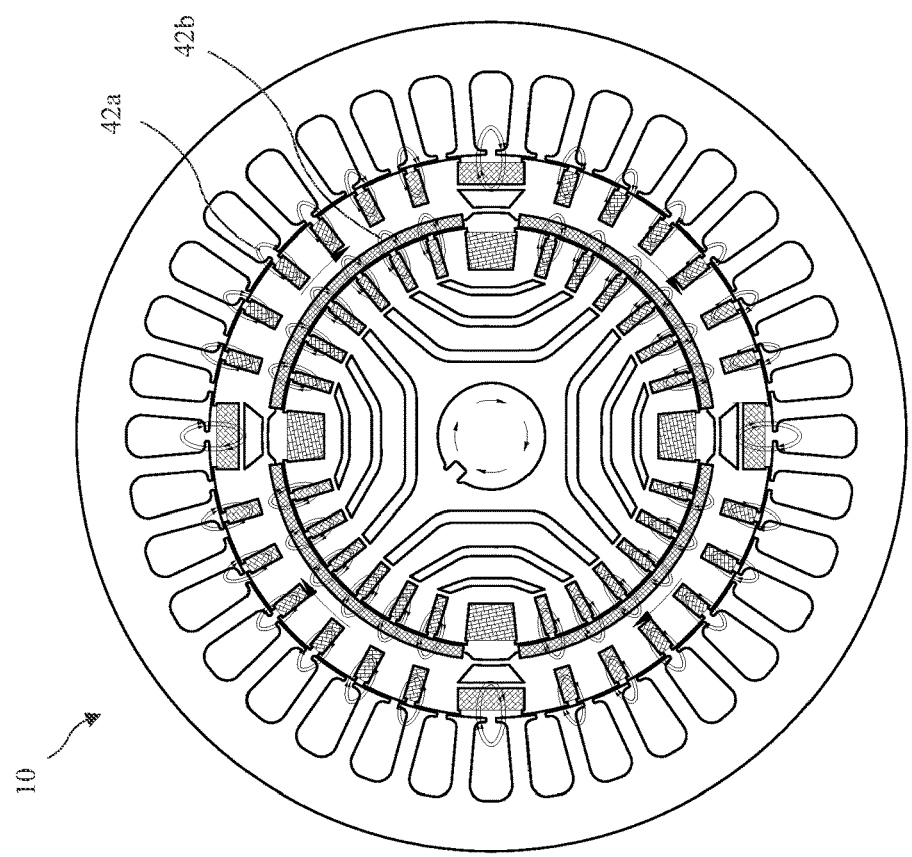
FIG. 11A shows magnetic field lines of the sixth embodiment of the motor having a hybrid inductive/permanent magnet outer rotor at startup according to the present invention.

Magnetic field lines 42a between the stator windings 18 and the bars 26a and 26b at startup and magnetic field lines 42b between the permanent magnets 22 and the bars 32a and 32b of the motor 10 just after at startup are shown in FIG. 11A. The magnetic field lines 42a result from slippage of the bars 26a and 26b with respect to the rotating stator magnetic field. The magnetic field lines 42a are immediately present at startup because the HPMSC outer rotor 20 is stationary at startup, and slippage is present between the stationary HPMSC outer rotor 20 and the rotating stator magnetic field. The slippage results in current generation in the bars 26 through magnetic induction, and the current produces torque on the HPMSC outer rotor 20 to accelerate the HPMSC outer rotor 20.

Nearly immediately after startup, as the HPMSC outer rotor 20 begins to rotate, slippage is developed between the permanent magnets 22 of the HPMSC outer rotor 20 and the bars 32a and 32b of the SC inner rotor 30, producing the magnetic field lines 42b. It is an important feature of the motor 10 that the magnetic field lines 42b are not present immediately at startup, because such magnetic field lines rotationally couple the HPMSC outer rotor 20 to the SC inner rotor, creating resistance to acceleration of the HPMSC outer rotor 20. Such resistance may prevent the HPMSC outer rotor 20 from overcoming the braking and pulsating torques caused by the permanent magnets in know LSPM motors, and limit the strength of the permanent magnets 22, thus limiting the efficiency of the motor 10. The motor 10 is thus self regulating, only coupling the HPMSC outer rotor 20 to the SC inner rotor 30 and motor shaft 14, after the HPMSC outer rotor 20 has overcome the braking and pulsating torques.

Figure 12A:
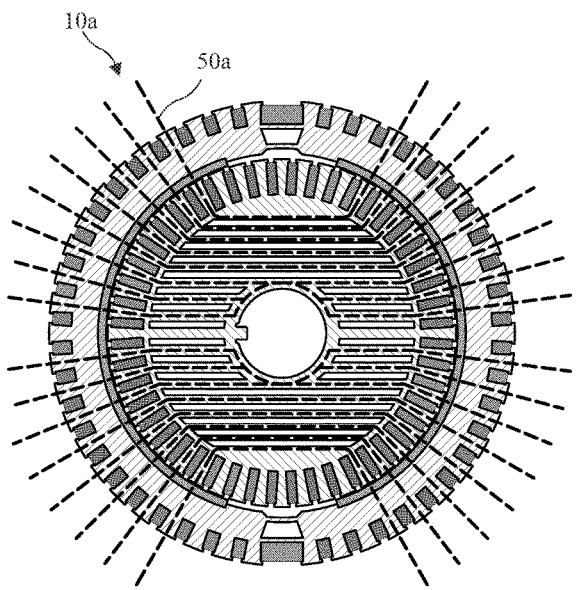
FIG. 12A shows magnetic field lines of a two pole embodiment of the sixth embodiment of the motor having a hybrid inductive/permanent magnet outer rotor at synchronous speed, excluding the stator according to the present invention.
Figure 12B:
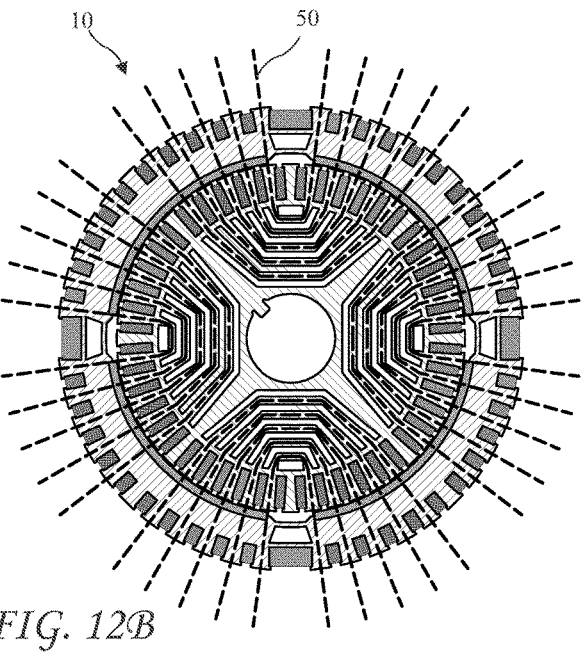
FIG. 12B shows magnetic field lines of a four pole embodiment of the sixth embodiment of the motor having a hybrid inductive/permanent magnet outer rotor at synchronous speed, excluding the stator according to the present invention.
Figure 12C:
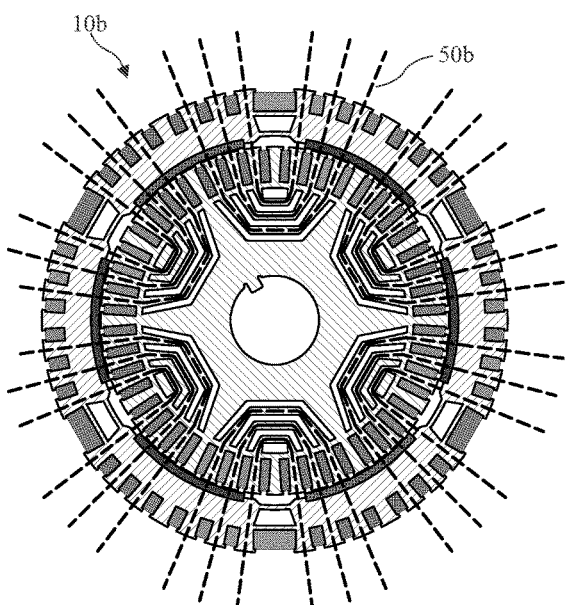
FIG. 12C shows magnetic field lines of a six pole embodiment of the sixth embodiment of the motor having a hybrid inductive/permanent magnet outer rotor at synchronous speed, excluding the according to the present invention.
Figure 12D:
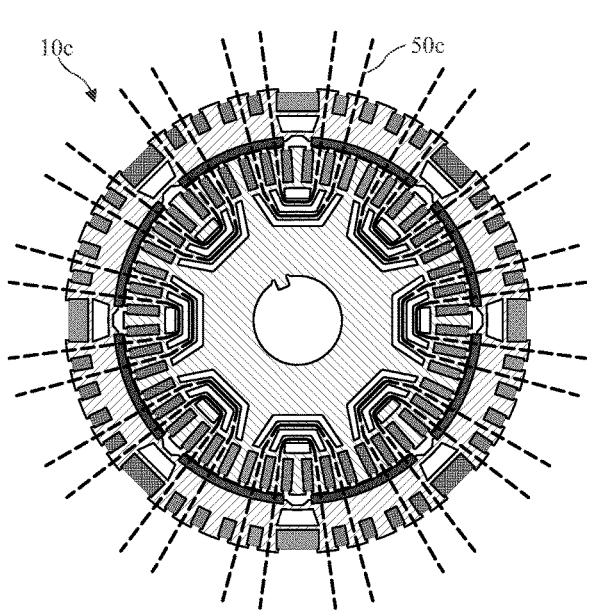
FIG. 12D shows magnetic field lines of an eight pole embodiment of the sixth embodiment of the motor having a hybrid inductive/permanent magnet outer rotor at synchronous speed, excluding the stator according to the present invention.

Magnetic field lines 50 between the stator windings 18 and the permanent magnets 22, and further penetrating the SC inner rotor 130 of the motor 10 at synchronous speed, are shown in FIG. 11B. At synchronous speed, there is no slippage between the rotating stator magnetic field and the bars 26a, 26b, 32a, and 32b, and therefore no electrical cooperation between the rotating stator magnetic field and the bars 26a, 26b, 32a, and 32b. The rotating stator magnetic field now cooperates fully with the permanent magnets 22, and is guided though the SC inner rotor by the flux barriers 38. Because the magnetic field lines resist Magnetic field lines of a two pole embodiment of the motor 10, excluding the stator 16, are shown in FIG. 12A, magnetic field lines of a four pole embodiment of the motor 10, excluding the stator 16, are shown in FIG. 12B, magnetic field lines of a six pole embodiment of the motor 10, excluding the stator 16, are shown in FIG. 12C, and magnetic field lines of an eight pole embodiment of the motor 10, excluding the stator 16, are shown in FIG. 12D.

Figure 13:
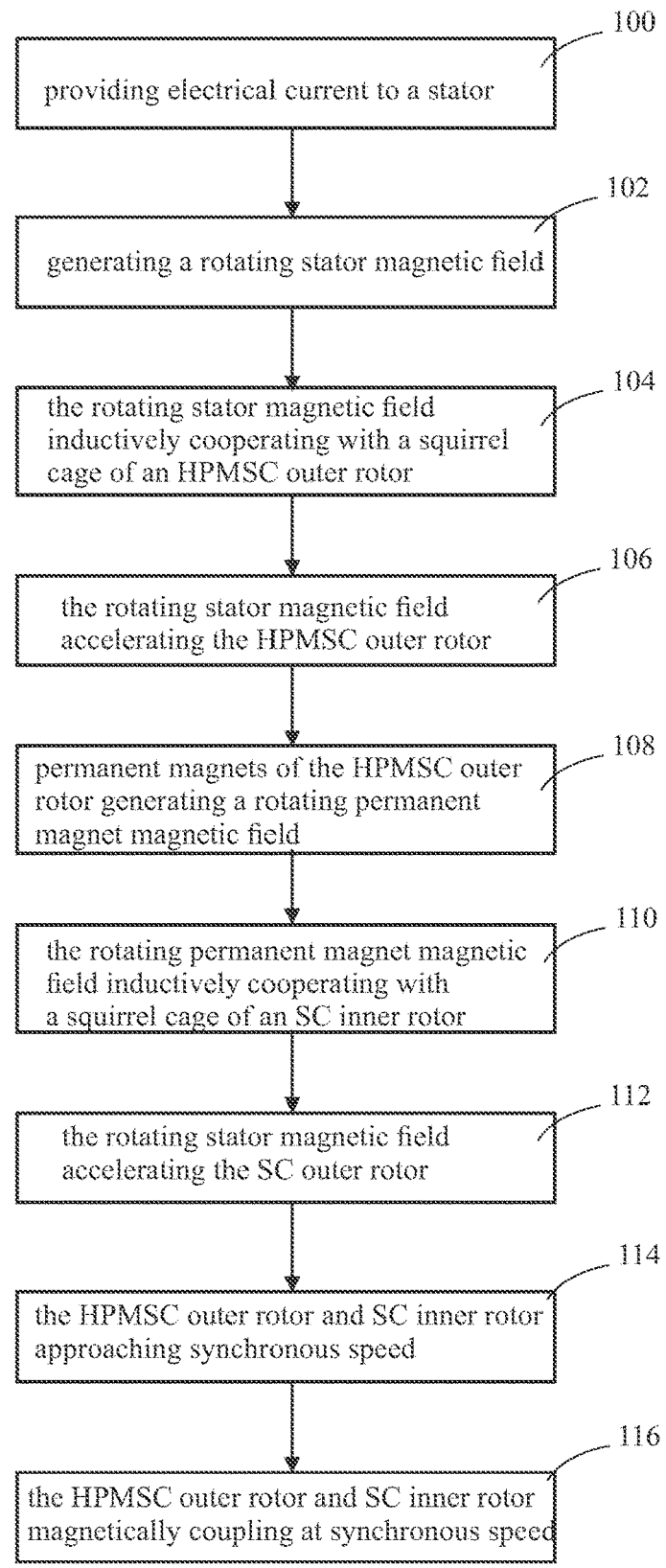
FIG. 13 shows a method according to the present invention.

A method according to the present invention is shown in FIG. 13. The method includes providing electrical current to a stator at step 100, generating a rotating stator magnetic field at step 102, the rotating stator magnetic field inductively cooperating with a squirrel cage of an HPMSC outer rotor at step 104, the rotating stator magnetic field accelerating the HPMSC outer rotor at step 106, permanent magnets of the HPMSC outer rotor generating a rotating permanent magnet magnetic field at step 108, the rotating permanent magnet magnetic field inductively cooperating with a squirrel cage of an SC inner rotor at step 110, the rotating stator magnetic field accelerating the SC outer rotor at step 112, the HPMSC outer rotor and SC inner rotor approaching synchronous speed at step 114, and the HPMSC outer rotor and SC inner rotor magnetically coupling at synchronous speed at step 116. An important feature of the method being that the HPMSC outer rotor is not coupled to the SC inner rotor until the HPMSC outer rotor is rotating, and can thus overcome the braking and pulsating torques which limit permanent magnet strength in LSPM motors.

A hybrid electric motor having an HPMSC outer rotor and an SC inner rotor is described. The HPMSC outer rotor includes first electrically conductive squirrel cage bars embedded in a first rotor core and a number of the permanent magnets on an inner surface of the second rotor core, the HPMSC outer rotor residing between the stator and SC inner rotor and coaxial with the motor shaft, and is not mechanically coupled to rotate with the motor shaft during any operation. The SC inner rotor is fixed to the motor shaft residing coaxial with the motor shaft and having a second rotor core, and a second electrically conductive squirrel cage bars embedded in the second rotor core, and flux barriers guiding the rotating stator field through the SC inner rotor at synchronous speed. Those skilled in the art will recognize other embodiments with different numbers of magnets, bars, and flux barriers not described here, but relying on the principles disclosed here, and those embodiments are intended to come within the scope of the present invention.

Figure 14:
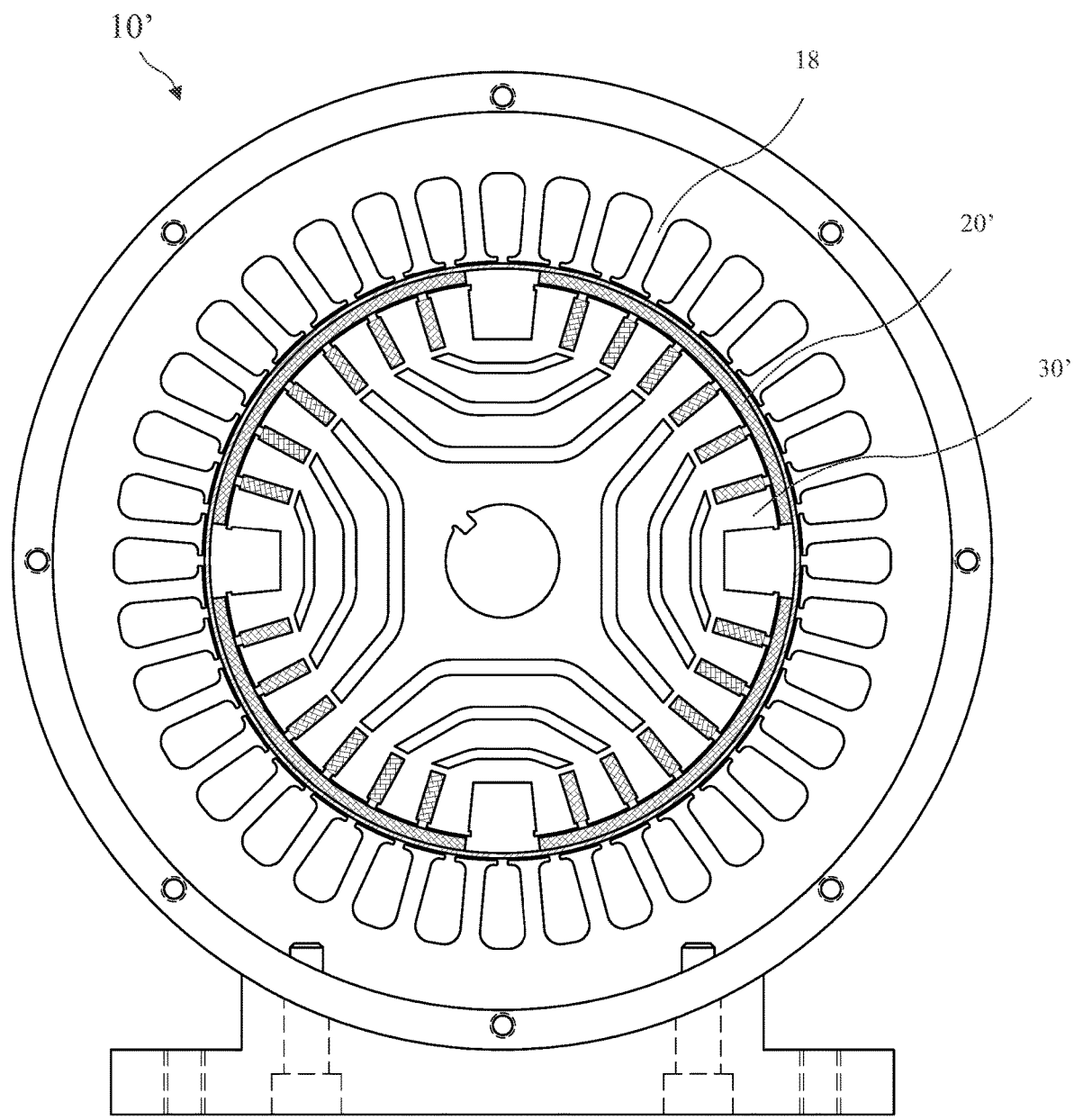
FIG. 14 shows a cross-sectional view of an embodiment of the present invention including a Hybrid Permanent Magnet Hysteresis (HPMH) outer rotor.

A cross-sectional view of a second hybrid induction motor 10' of the present invention including a Hybrid Permanent Magnet Hysteresis (HPMH) outer rotor 20' is shown in FIG. 14. The inductive starting element is an eddy current (or hysteresis) ring 60 (see FIG. 16) which replaces the squirrel cage 26a and 26b of the HPMSC outer rotor 20 (see FIG. 6) to provide initial starting torque. The major squirrel cage bars 32b of the inner SC inner rotor are not required and not shown in the hybrid induction motor 10'. The hybrid induction motor 10' is otherwise similar to the hybrid induction motor 10.

Figure 15B:
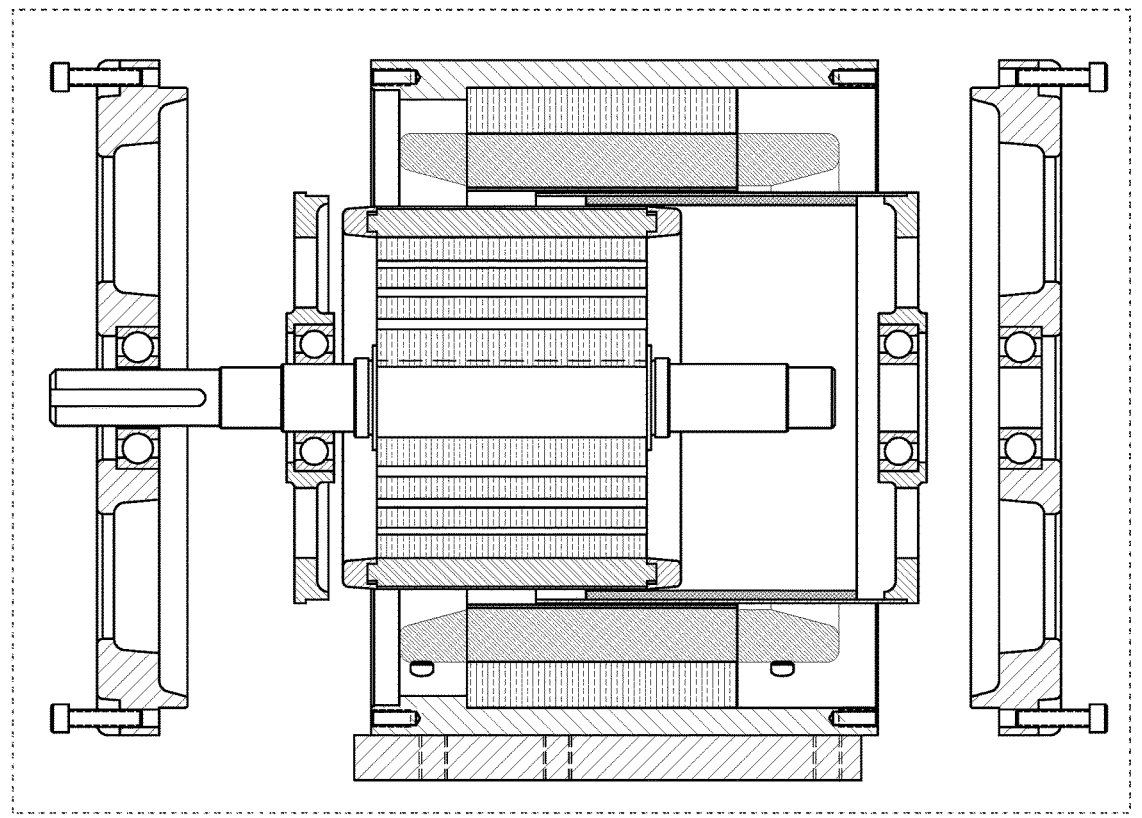
FIG. 15B is an exploded cross-sectional side view of the embodiment of the present invention including an HPMH outer rotor.
Figure 15A:
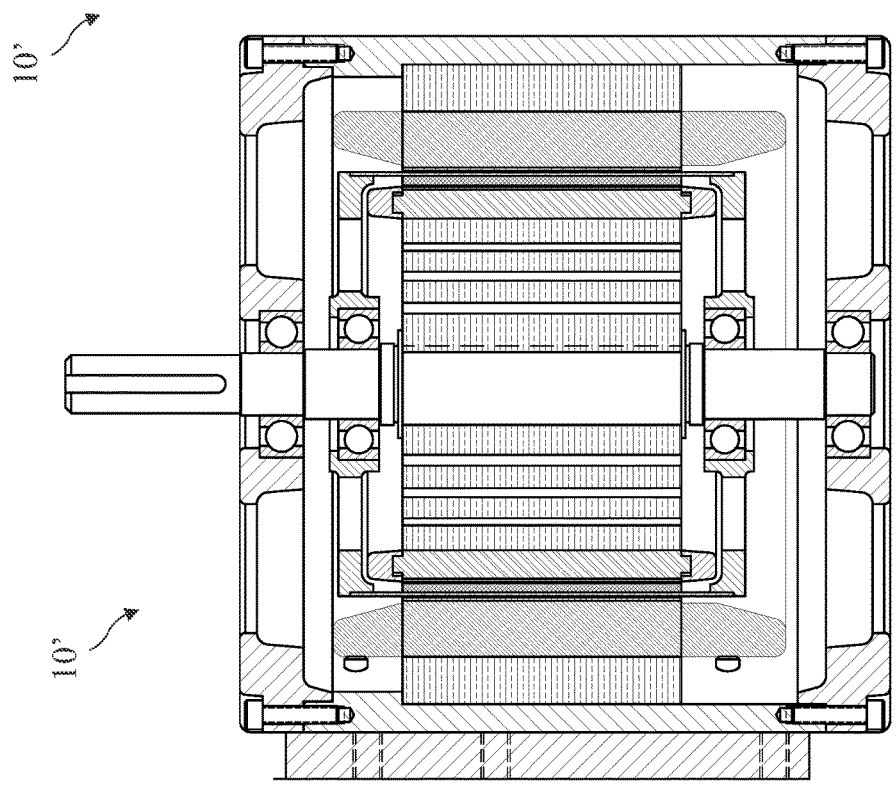
FIG. 15A is a cross-sectional side view of the embodiment of the present invention including an HPMH outer rotor.

A cross-sectional side view of the hybrid induction motor 10' including an HPMH outer rotor is shown in FIG. 15A and an exploded cross-sectional side view of the hybrid induction motor 10' including an HPMH outer rotor is shown in FIG. 15B.

Figure 16:
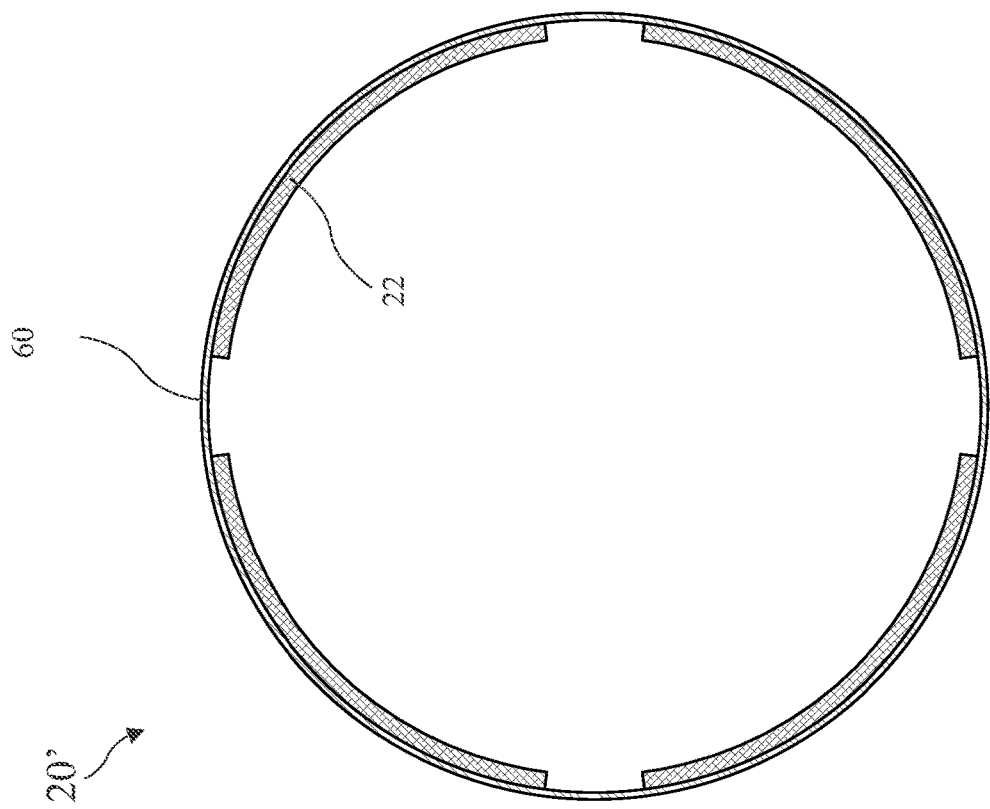
FIG. 16 is a cross-sectional side view of the HPMH outer rotor according to the present invention.

A cross-sectional side view of the HPMH outer rotor according to the present invention showing the eddy current ring 60 is shown in FIG. 16. Once the HPMH outer rotor 20' reaches synchronous speed, the eddy current ring 60 has no effect on motor operation. The eddy current ring 60 may be any electrically conductive material would be potential material for starting element and is commonly hard chrome or cobalt steel but may be any non ferrous material. A preferably material for the HPMH outer rotor ring of the present invention is copper which is efficient because of its high electrical conductivity. Silver is slightly better performing than copper having better electrical conductivity and aluminum is lower performing than copper having less electrical conductivity. Potentially, new nano technology and a new class of highly conductive material could offer better performance than copper.

Figure 17:
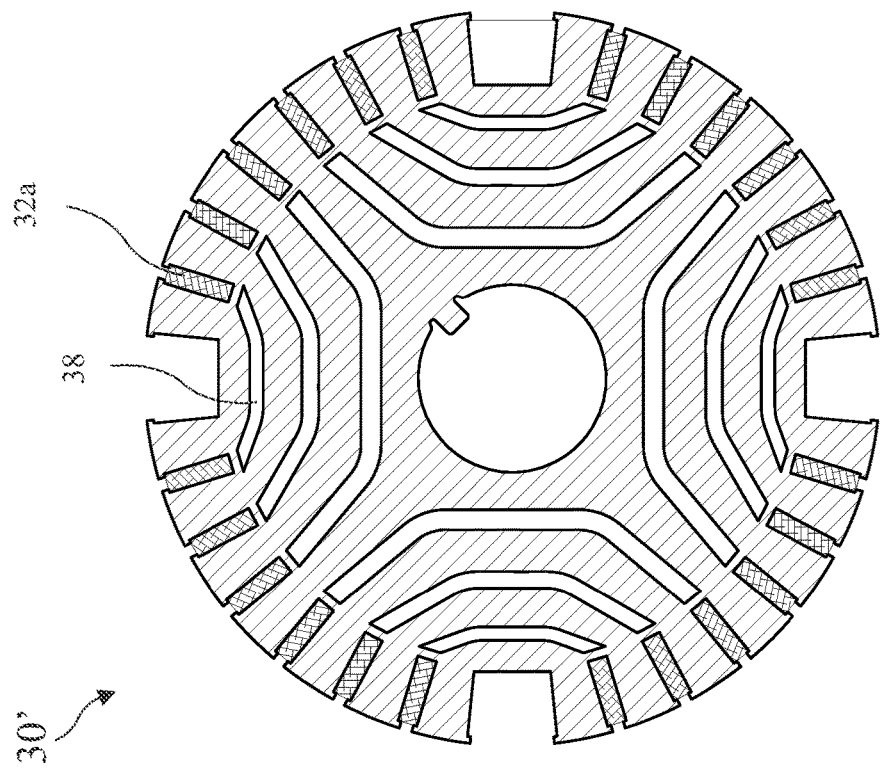
FIG. 17 is a cross-sectional side view of a second SC inner rotor according to the present invention.

A cross-sectional side view of the second SC inner rotor 30' is shown in FIG. 17. The SC inner rotor 30' does not show the major squirrel cage bars 32b which may be present, but are not necessary. The SC inner rotor 30' is otherwise similar to the SC inner rotor 30.

While the invention herein disclosed has been described by means of specific embodiments and applications thereof, numerous modifications and variations could be made thereto by those skilled in the art without departing from the scope of the invention set forth in the claims.

I claim:

1. A hybrid squirrel cage/permanent magnet motor comprising:
   a motor housing;
   a stator fixed to the motor housing and producing a rotating stator magnetic field;
   a motor shaft rotatably connected to the motor housing and extending from at least one end of the motor housing for attachment to a load;
   a second rotor rotationally fixed to the motor shaft residing coaxial with the motor shaft, the second rotor including:
      a second rotor core; and
      angularly spaced apart electrically conductive second squirrel cage bars embedded in the second rotor core;
   a first rotor residing between the stator and second rotor and coaxial with the motor shaft and not rotationally mechanically coupled to the motor shaft to rotate with the motor shaft and including:
      a first rotor core;
      a multiplicity of electrically conductive, angularly spaced apart first squirrel cage bars embedded in a surface of the first rotor core facing the stator configured to cooperate with the rotating stator magnetic field to provide torque at startup; and
      permanent magnets residing radially spaced from the first squirrel cage bars towards the second rotor, and angularly overlapping the first squirrel cage bars, the first squirrel cage bars residing radially between the permanent magnets and the stator;
   wherein the first rotor and the second rotor are magnetically couplable during synchronous operation.

2. The motor of claim 1, further including flux barriers inside the second rotor core, the flux barriers guiding the rotating stator magnetic field through the second rotor core during synchronous operation, wherein the flux barriers are voids in the second rotor core.

3. The motor of claim 1, further including flux barriers inside the second rotor core, the flux barriers guiding the rotating stator magnetic field through the second rotor core during synchronous operation, wherein the flux barriers are concave paths connecting interior ends of the second squirrel cage bars.

4. The motor of claim 1, wherein:
   the first squirrel cage bars comprise a multiplicity of angularly spaced apart first minor squirrel cage bars separated into a number N of first groups, each of the first groups comprising consecutive ones of the first minor squirrel cage bars; and
   the first groups angularly separated by a number N of angularly spaced apart and larger first major squirrel cage bars, each of the first major squirrel cage bars separating consecutive ones of the first groups.

5. The motor of claim 4, wherein the second electrically conductive squirrel cage bars are embedded angularly spaced apart in a second exterior surface of the second rotor core.

6. The motor of claim 1, wherein:
   the first rotor includes a number N of the permanent magnets;
   the second electrically conductive squirrel cage bars are proximal to a surface of the second rotor core facing the first rotor and comprise N angularly spaced apart groups of bars;
   each one of the N groups of bars includes right half bars in a right half, and left half bars in a left half, and
   spaced apart flux barriers reach into the second rotor core from first interior ends of at least one of the left half bars of each of the N groups of bars, and to second interior ends of at least one of the right half bars of each of the N groups of bars.

7. The motor of claim 6, wherein the flux barriers connecting the left half bars with the right half bars are laterally symmetric.

8. The motor of claim 6, wherein the flux barriers connecting left most of the left half bars with right most of the right most bars reach deeper into the second rotor core than the flux barriers connecting the left half bars and the right half bars nearer to a center of each of the N groups of bars.

9. The motor of claim 1, wherein:
   the stator is outside both the first rotor and the second rotor;
   the second rotor is an inner rotor; and
   the first rotor is an outer rotor residing between the inner rotor and the stator.

10. The motor of claim 1, wherein at synchronous speed:
    the first squirrel cage bars are angularly aligned with the second squirrel cage bars; and
    third magnetic field lines pass from the stator, individually between consecutive ones of the first squirrel cage bars, through the permanent magnets, and between the second squirrel cage bars.

11. The motor of claim 1, wherein:
    the permanent magnets comprise N angularly spaced apart permanent magnets;
    the first squirrel cage bars comprise:
       a number N of first groups of electrically conductive first minor squirrel cage bars embedded in the first rotor core, each of the N first groups residing angularly aligned with one of the N permanent magnets; and
       the number N of electrically conductive first major squirrel cage bars embedded in the first rotor core, each the first major squirrel cage bars have a larger cross-section than each of the first minor squirrel cage bars and the first major squirrel cage bars angularly aligned with gaps between consecutive ones of the N permanent magnets; and
    each one of the N first major squirrel cage bars angularly separating consecutive ones of the N first groups.

12. The motor of claim 11, wherein:
    the second squirrel cage bars comprise:
       the number N groups of second minor squirrel cage bars; and
       the number N second major squirrel cage bars; and
    during synchronous operation, the second minor squirrel cage bars are individually aligned with the first minor squirrel cage bars, and the second major squirrel cage bars are individually aligned with the first major squirrel cage bars.

13. The motor of claim 1, wherein
    during synchronous operation, individual one of the second squirrel cage bars are aligned with individual one of the first squirrel cage bars.

14. The motor of claim 4, wherein:
    the permanent magnets comprise the number N angularly spaced apart permanent magnets; and each of the N groups of minor squirrel cage bars resides over one of the N permanent magnets.

15. A hybrid squirrel cage/permanent magnet motor comprising:
- a motor housing;
- a stator fixed to the motor housing and producing a rotating stator magnetic field;
- a motor shaft rotatably connected to the motor housing and extending from at least one end of the motor housing for attachment to a load;
- a second rotor rotationally fixed to the motor shaft residing coaxial with the motor shaft, the second rotor including:
  - a second rotor core; and
  - angularly spaced apart electrically conductive second squirrel cage bars embedded in the second rotor core;
- a first rotor residing between the stator and second rotor and coaxial with the motor shaft and not rotationally mechanically coupled to the motor shaft to rotate with the motor shaft during any operation and including:
  - a first rotor core;
  - angularly spaced apart electrically conductive first squirrel cage bars embedded in the first rotor core configured to cooperate with the rotating stator magnetic field to provide torque at startup, the first squirrel cage bars simultaneously angularly alignable with the second squirrel cage bars during synchronous operation; and
- permanent magnets residing in the first rotor core radially displaced from the first squirrel cage bars towards the second rotor, and angularly overlapping the first squirrel cage bars and, the first squirrel cage bars residing radially between the permanent magnets and the stator.

16. The motor of claim 15, wherein:
the permanent magnets comprise N permanent magnets;
the first squirrel cage bars include first minor squirrel cage bars separated into a number N of first groups, each of the first groups comprising consecutive ones of the first minor squirrel cage bars; and
each of the first groups of the first squirrel cage bars radially overlap one of the N permanent magnets.

17. A hybrid squirrel cage/permanent magnet motor comprising:
- a motor housing;
- a stator fixed to the motor housing and producing a rotating stator magnetic field;
- a motor shaft rotatably connected to the motor housing and extending from at least one end of the motor housing for attachment to a load;
- a second rotor rotationally fixed to the motor shaft residing coaxial with the motor shaft, the second rotor including:
  - a second rotor core; and
  - angularly spaced apart electrically conductive second squirrel cage bars embedded in the second rotor core;
- a first rotor residing between the stator and second rotor and coaxial with the motor shaft and not rotationally mechanically coupled to the motor shaft to rotate with the motor shaft and including:
  - a first rotor core;
  - angularly spaced apart electrically conductive first squirrel cage bars embedded in the first rotor core configured to cooperate with the rotating stator magnetic field to provide torque at startup;
  - permanent magnets residing under the first squirrel cage bars and on a surface of the first rotor core facing the second rotor; and
- all consecutive stator field lines are separated by the first squirrel cage bars and the second squirrel cage bars during synchronous operation.

18. The motor of claim 17, wherein the stator field lines are guided through the permanent magnets by the first squirrel cage bars and the second squirrel cage bars during synchronous operation.

* * * * *